May 16, 1933.  A. L. RIKER, JR  1,909,010
VIBRATION INSULATOR
Filed April 26, 1930
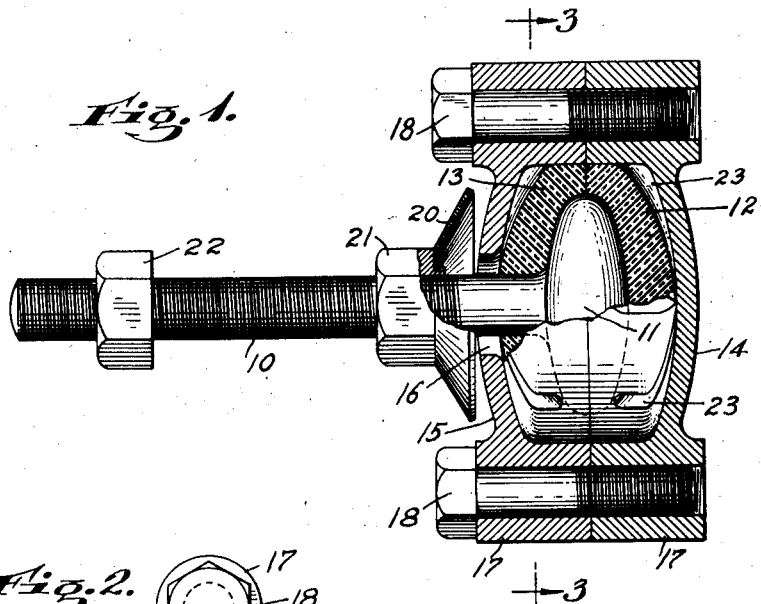
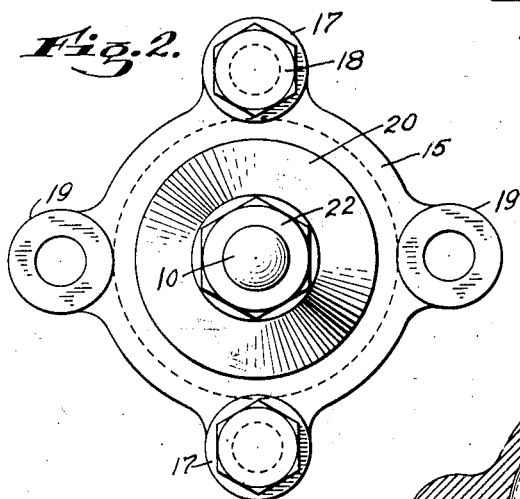
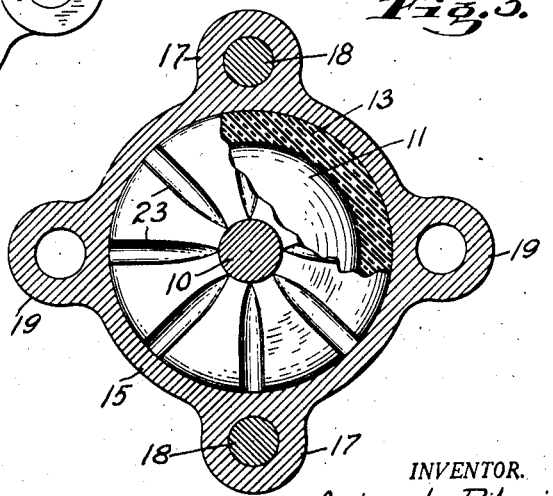
INVENTOR.
Andrew L. Riker, jr.
BY
, ATTORNEY.

Patented May 16, 1933

1,909,010

UNITED STATES PATENT OFFICE

ANDREW L. RIKER, JR., OF FAIRFIELD, CONNECTICUT, ASSIGNOR TO RUBBER SHOCK INSULATOR CORPORATION, OF BRIDGEPORT, CONNECTICUT, A CORPORATION OF DELAWARE

VIBRATION INSULATOR

Application filed April 26, 1930. Serial No. 447,504.

My invention relates to vibration insulators and has for an object to provide a novel non-metallic connection between two units to cushion shocks and eliminate transfer of vibrations from one unit to another.

I am aware that it is not new to interpose rubber or similar material between a mechanism and its support for the purpose of damping vibrations, but my invention has for an object to provide an improved construction which will be of lower production cost and which will be more efficient as a vibration damper.

In designing my improved insulator cognizance is taken of the fact that rubber is a substantially incompressible material and that the quality of rubber which is normally spoken of as "compressibility", is actually resilient fluidity. To this end, my invention, while including means for holding a rubber vibration insulator under pressure, provides also certain voids or spaces in which the rubber may flow when distorted. These voids which may be either in the rubber or in the confining means, also take care of thermal expansion of the rubber.

More specifically, it is an object of my invention to provide a vibration insulator in which the damping element is formed with slots so located as to permit resiliently restricted but universal oscillatory movement of the member supported by, or connected to, said insulator.

These and other objects of my invention will appear in the following description of a preferred embodiment and thereafter the novelty and scope of the invention will be pointed out in the claims.

In the accompanying drawing;

Figure 1 is a view, partly in side elevation and partly in section, of a support embodying my invention;

Fig. 2 is a view looking from the left hand end of Fig. 1; and

Fig. 3 is a view in section taken substantially on the line 3—3 of Fig. 1.

In the particular embodiment illustrated in the drawing, I use a foot bolt comprising a threaded shank 10 having a head 11 which is oval, as viewed edgewise, but is circular as viewed endwise of the bolt. The head 11 is of considerably larger diameter than the shank and is embedded in a pair of rubber insulator disks 12 and 13 respectively. These disks are alike in form except that the outer disk 13 has an opening therein through which the shank of the foot bolt may pass with a snug fit. Each insulator disk is formed with a recess adapted to receive one-half of the depth of the head, and the outer face of each disk is convex.

The disks are held under pressure in a housing comprising a base section 14 and a cap section 15. Each section is cup-shaped, being formed with a recess in which one of the insulator disks is snugly fitted, the recess having a concave wall conforming to the convex wall of the disk. The cap section 15 is formed with an opening 16 to clear the shank 10 of the foot bolt and this opening is considerably larger than the diameter of the shank so as not to restrict oscillatory movements of the bolt.

Each housing section is formed with a pair of projecting lugs 17 at diametrically opposite sides which are formed with bolt holes to receive clamping bolts 18. The bolts are threaded into the lugs of the base section. The disks 12 and 13 are somewhat larger than the recesses in the housing sections, so that when the clamping bolts are tightened the disks will be placed under a predetermined degree of pressure and will hold the head of the foot bolt firmly in position. Each of the housing sections is also provided with lugs 19 disposed preferably at 90° to the lugs 17. The lugs 19 are apertured but not threaded and provide means for passing attachment bolts therethrough to attach the housing to a suitable support.

In order to prevent oil, grease and other dirt from entering the housing through the opening 16, I provide a dust cap 20 which is preferably secured to a nut 21 threaded on the shank 10. The dust cap is dished and may be screwed down close to the outer face of cap section 15 which is convex, without interfering with oscillatory movements of the foot bolt. Another nut 22 is also threaded on the shank 10 and between these nuts may be clamped the unit which is to be supported by the vibration insulator.

In order to provide expansion space in which the rubber may flow when the foot bolt is subjected to vibrational or other movements, each rubber disk is provided in its outer surface with tapering radial slots 23 which increase in depth toward the periphery of each disk. Hence, when the bolt 10 is oscillated the slots will contract or expand as the rubber is distorted to provide the necessary resiliency. Were it not for these slots the bolt 11 could not be oscillated without displacement of the rubber from a contracted region at one side of the head to an expanded region at another. This, in the case of rapid oscillations, would tend to subject the rubber to such severe stresses that it would act substantially like a rigid solid, and instead of absorbing the oscillatory movements, would transmit them to the support. The slots also provide air chambers, giving an air cushioning effect. The air is sealed in these chambers owing to the fact that the rubber discs, when held under pressure in the housing, tend to adhere to the metal walls because of vulcanization between the rubber and the metal. It will be observed that the slots 23 in the rubber discs are so disposed as to give a maximum clearance at the periphery of each disc. Hence, the center of oscillation will substantially coincide with the center of the head 11. Also as viewed in Fig. 3, the slots radiate in all directions so that a universal oscillatory movement is permitted.

While this construction is adapted particularly to absorb oscillatory vibrations, it will also cushion axial movement, because the convex surfaces of the head will translate axial thrusts into angular stresses directed toward the deeper parts of the slots.

While I have shown the vibration insulator in the drawing, as applied to a horizontal bolt, it will be obvious that the same construction will serve for a vertical bolt or for one placed at any angle.

It will be observed that the construction is such that the insulator disks 12 and 13 are of substantially the same form, the only difference being that one of the disks has a central opening through which the shank 10 may pass. Hence, the disks may be made from a mold having a common base, but with two different top plates. The housing sections are also similar in form, except that the section 15 has an opening 16 therein and the bolt holes in the lugs 17 of the section 14 are threaded. When the container is made of castings a single pattern or gated pattern will produce both the top and bottom section, and thereafter the machining by which the parts are finished to requirement, will determine whether they will be caps or bases.

While I have described a specific embodiment of my invention, I reserve the right to make such changes in form, construction and arrangement of parts as fall within the spirit and scope of the following claims.

I claim:

1. A vibration insulator comprising a housing, a rubber block confined in the housing and formed exteriorly in opposite faces thereof with grooves extending to the periphery of the block and adapted to form air cushions, said grooves increasing in depth toward said periphery, and a foot bolt having an enlarged head embedded in the block and a shank projecting from the head through one of the groove faces of the block and through the housing.

2. A vibration insulator comprising a foot bolt formed with an enlarged head, a rubber block in which the head is embedded, said block consisting of a pair of cup-shaped disks, a housing for the block, said housing comprising a cap section and a base section, means for clamping said sections together to hold the block under pressure in the housing, each disk being formed exteriorly with grooves extending to and increasing in depth toward the periphery of said section, the grooves being disposed radially with respect to the foot bolt and cooperating with the housing to form air cushions.

3. A vibration insulator comprising a foot bolt formed with an enlarged head, a rubber block in which the head is embedded, said block consisting of a pair of cup-shaped disks, a housing for the block, said housing comprising a cap section and a base section, means for clamping said sections together to hold the block under pressure in the housing, each block section being formed in its outer surface with grooves extending to the periphery of the section, one of the block sections being formed with an opening through which the shank of the bolt may pass with a snug fit, the cap section of the housing being formed with an opening to clear the shank of the bolt, and a dust cap adjustable on the shank to cover the opening in the housing cap.

4. A vibration insulator comprising a foot bolt formed with an enlarged lenticular head, a lenticular block of rubber in which said head is embedded, said block comprising a pair of cup-shaped disks, a housing for the lenticular block, said housing being formed of a cup-shaped base section and a cup-shaped cap section adapted to fit closely against the lenticular surfaces of the block, and means for clamping the housing sections together to place the block under pressure, each of said disks being formed in its lenticular surface with radiating grooves extending to the periphery of the block section.

5. A vibration insulator comprising a foot bolt formed with an enlarged lenticular head, a lenticular block of rubber in which said head is embedded, said block comprising a pair of cup-shaped disks, a housing for the lenticular block, said housing being formed of a cup-shaped base section and a cup-shaped cap section adapted to fit closely against the lenticular surfaces of the block, means for clamping the housing sections together to place the block under pressure, each of said block sections being formed in its lenticular surface with radiating grooves extending to and increasing in depth toward the periphery of the block section, the housing member being formed with means for attachment to a support, and an attachment means on the shank of the bolt.

6. A vibration insulator comprising a housing, a rubber block confined in the housing with air chambers formed between the housing and the block and adapted to serve as air cushions, and a supporting member having a head embedded in the block and a shank projecting through the block and the housing, said chambers being substantially radially disposed with respect to the axis of the shank and extending to and increasing in cross-section toward the periphery of the block.

7. A vibration insulator comprising a housing, a rubber block confined in the housing and formed in an exterior face thereof with grooves extending to the periphery of the block, said grooves cooperating with the housing to provide air cushions, and a foot bolt having an enlarged head embedded in the block and a shank projecting through the block and the housing, said grooves being radially disposed with respect to the axis of the shank and increasing in cross-section toward the periphery of the block.

In testimony whereof, I have signed this specification.

ANDREW L. RIKER, Jr.